Figure 1:
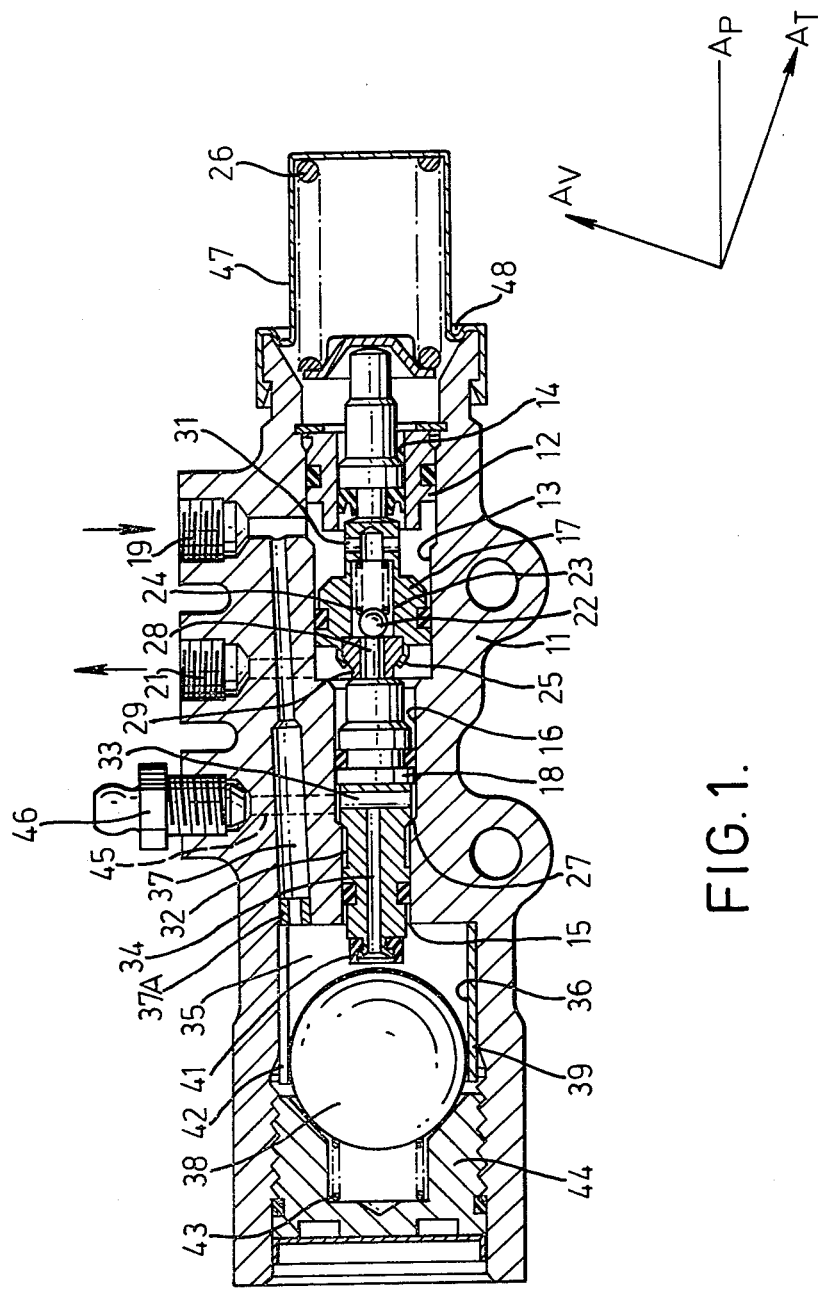

//  # United States Patent [19]

Young

[11] 4,351,570

[45] Sep. 28, 1982

[54] VEHICLE BRAKE PRESSURE PROPORTIONING VALVES

[75] Inventor: Alastair J. Young, Kenilworth, England

[73] Assignee: Automotive Products Limited, Leamington Spa, England

[21] Appl. No.: 215,430

[22] Filed: Dec. 11, 1980

[30] Foreign Application Priority Data

Dec. 14, 1979 [GB] United Kingdom ................. 7943238

[51] Int. Cl.³ .............................................. B60T 8/26
[52] U.S. Cl. .................................... 303/24 F; 303/6 C
[58] Field of Search ............. 188/349; 303/6 C, 24 A, 303/24 C, 24 F

[56] References Cited

U.S. PATENT DOCUMENTS 4,219,243  8/1980  Hayashida ......................... 303/6 C

FOREIGN PATENT DOCUMENTS 1340956 12/1973 United Kingdom .
2010425  6/1979 United Kingdom .
2021220 11/1979 United Kingdom .
2023248 12/1979 United Kingdom .

Primary Examiner—Duane A. Reger
Attorney, Agent, or Firm—Kemon & Estabrook

[57] ABSTRACT

A vehicle brake pressure proportioning valve has a stepped proportioning plunger movable by brake pressure against a loading spring. A control plunger subject to pressure from an inlet port co-operates with a metering valve associated with the proportioning plunger. For low inlet pressures both plungers move together and there is no significant pressure drop through the valve but at a particular vehicle deceleration a control mass moves to hydraulically lock the control plunger and allow full operation of the metering valve. A control spring acts on the control mass with a force which, at the time of hydraulic locking, varies according to the distance moved by the control plunger and, by inference, the weight of the vehicle.

12 Claims, 2 Drawing Figures

VEHICLE BRAKE PRESSURE PROPORTIONING VALVES

This invention relates to vehicle brake pressure proportioning valves.

Typically, a proportioning valve is fitted to the rear brake system of the vehicle and allows full master cylinder pressure to be transmitted to the rear brakes until a predetermined brake pressure is reached, whereupon the valve operates to allow only a proportion of further increments of master cylinder pressure to reach the rear brakes. The pressure at which the valve starts to operate to allow the proportional increase in brake pressure can be varied by inertia means so as to compensate for variations in the loading of the vehicle.

British Patent Specification No. 1,540,643 shows a valve of this type in which a proportioning valve plunger is biassed by a loading spring whose preload is varied by a control piston subjected to master cylinder pressure. This preload is set by an inertia valve which locks the control piston when a particular deceleration is reached. This known valve is too bulky for many vehicle installations and is disadvantageous in production in that the initial preload of the loading spring cannot easily be adjusted.

An object of the invention is to provide an improved vehicle brake pressure proportioning valve of the inertia-controlled type.

According to the invention there is provided a vehicle brake pressure proportioning valve comprising a housing, an inlet port in the housing for connection to a driver-controlled source of fluid pressure, an outlet port in the housing for connection to one or more brakes of the vehicle, a stepped bore in the housing, a stepped proportioning valve plunger slidable in the stepped bore and having one, relatively small, piston area subject to inlet pressure from the inlet port and another, relatively large, piston area subject to brake pressure at the outlet port, a loading spring which applies a biassing load to the proportioning valve plunger in a direction opposing movement of the plunger under the action of brake pressure, metering valve means associated with the proportioning valve plunger for controlling flow between the inlet port and the outlet port, a control plunger slidable in the stepped bore and co-operating with the metering valve means such that relative movement of the proportioning valve plunger away from the control plunger changes the metering valve means from an open state permitting flow between the inlet port and the outlet port to a closed state preventing flow from the inlet port to the outlet port, the control plunger being movable with the proportioning valve plunger during movement of the proportioning valve plunger against the biassing load when brake pressure is increasing, a liquid filled control chamber having a volume which varies with movement of the control plunger in the stepped bore and inertia valve means including a control mass which is movable under vehicle deceleration to close a control passage connecting the control chamber and the inlet port to prevent further variations in said volume, the proportioning valve plunger being movable away from the control plunger against the biassing load under increasing inlet port pressure to bring the metering valve means into an operative state in which the proportioning valve plunger shuttles to and fro with further increasing inlet port pressure to allow metered flow through the metering valve means and allow brake pressure to increase at a reduced rate, wherein a control spring acts upon the control mass to exert a load on the control mass which varies according to the distance moved by the control plunger before the control passage is closed.

Figure 2:
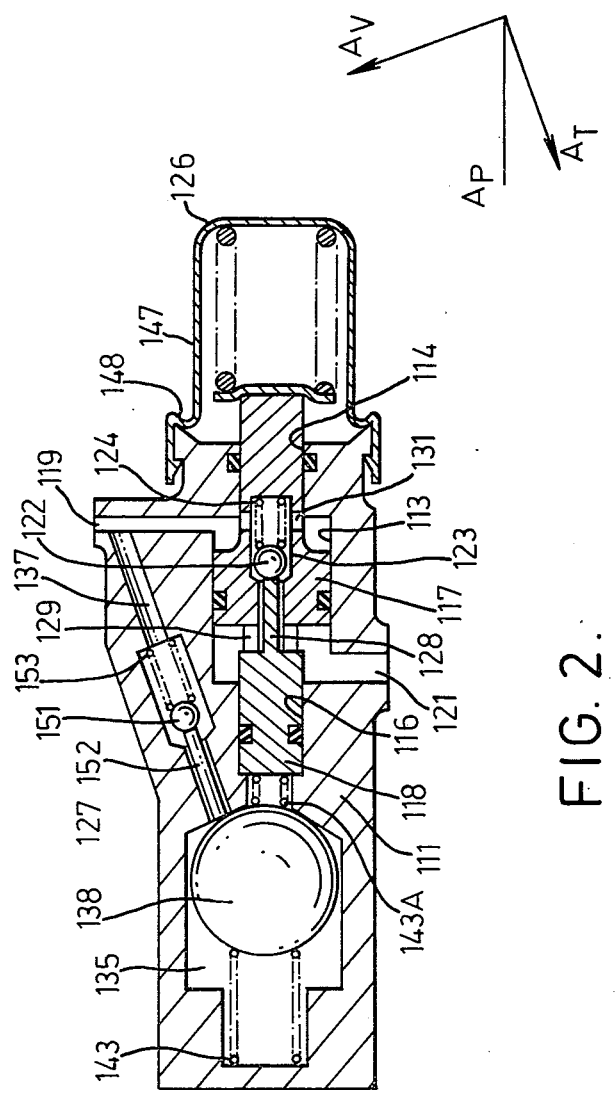

The invention will now be described by way of example and with reference to the accompanying drawings, in which FIG. 1 is a cross-section through one example of a vehicle brake pressure proportioning valve according to the invention; and FIG. 2 is a cross-section through another example of a vehicle brake pressure proportioning valve according to the invention.

Referring to FIG. 1, the proportioning valve shown has a housing comprising a cast body 11 and a sleeve 12. The housing incorporates a stepped bore having four working portions 13, 14, 15, 16. A stepped proportioning valve plunger 17 is slidable in the bore portions 13 and 14 formed in the body 11 and the sleeve 12 respectively. A stepped control plunger 18 is slidable in the bore portions 5 and 16 which are both formed in the body 11.

An inlet port 19 is provided for connection to a driver's master cylinder or other driver-controlled source of fluid pressure and opens into the stepped bore such that inlet or master cylinder pressure can act on one, relatively small, piston area of the proportioning valve plunger 17 defined by the difference in the cross-sectional areas of bore portion 13 and bore portion 14. An outlet port 21 for connection to the rear brakes of a vehicle to which the proportioning valve is fitted opens into the stepped bore between the proportioning valve plunger 17 and the control plunger 18 such that brake pressure can act on another, relatively large, piston area of the proportioning valve plunger 17 defined by the cross-sectional area of bore portion 13.

Metering valve means associated with the proportioning valve plunger 17 comprises a ball 22 in an axial drilling 23 in the proportioning valve plunger 17, spring loaded by a light coil spring 24 towards a valve seat member 25. A loading spring 26 urges the proportioning valve plunger 17 towards the control plunger 18. When there is little or no pressure at the inlet and outlet ports 19 and 21, the control plunger 18 supports the proportioning valve plunger 17 against the load of spring 26, the load being reacted by a shoulder 27 contacting the step between bore portions 15 and 16. In this condition the metering valve ball 22 is prevented from seating by a pin 28 which has flats to allow flow through the axial drilling 23, the flow path between the inlet port 19 and the outlet port 21 being completed by radial slots 29 in the valve seat member 25 and a diametral drilling 31 in the proportioning valve plunger 17.

The control plunger 18 together with bore portions 15 and 16 defines an annular control chamber 32 which communicates with the inlet port 19 through a control passage comprising a diametral drilling 33, an axial passage 34, a chamber 35 formed by a bore 36 adjacent to the end of the body 11 remote from the loading spring 26 and a passage 37 in the body 11. A restrictor 37A is in the end of passage 37.

Inertia valve means for closing the annular chamber 32 comprises a control mass in the form of a ball 38 which can slide or roll through a liner 39 in bore 36 and a resilient seat member 41 on the end face of the control plunger 18.

The liner 38 consists of a length of tubing having an axial slit 42 to allow air to bleed past the inertia valve ball 38. The control chamber 32 cn be bled separately through a drilling 45 closed by a bleed nipple 46.

A control spring 43 acts on the inertia valve ball 38 to tend to push it towards seat member 41 and is housed in a recess in an end plug 44 which effectively forms part of the housing. Spring 43 is relatively weak so that when the valve is fitted to the vehicle with its axis $A_P$ inclined to the horizontal axis $A_T$, as indicated on FIG. 1, the inertia valve ball 38 can rest on the end plug 44 against the compression of spring 43, leaving a clearance between itself and the inertia valve seat member 41. $A_T$ also indicates the direction of travel while $A_V$ indicates the vertical direction.

The loading spring 26 is housed in a pressed cap 47 which is retained by staking and is adjustable for length (and hence the preload of spring 26) by controlled collapsing of frusto-conical section 48 as described in British Patent Specification No. 1,488,353.

In use, the valve is installed on a vehicle and connected to a driver's master cylinder and brakes as described above. Brake fluid enters the inlet port 19 and, for low magnitudes of master cylinder pressure, passes out to the brakes through the outlet port 21 with substantially no reduction in pressure. As master cylinder pressure increases, it exerts a force on the proportioning valve plunger 17 which tends to compress the loading spring 26, this force being equivalent to master cylinder pressure acting on the cross-sectional area of bore portion 14. When this force becomes equal to the preload of spring 26 the proportioning valve plunger starts to move towards the cap 47. During this initial movement of the proportioning valve plunger 17, the control plunger 18 and also the pin 28 and metering valve ball 22 all tend to remain in their original positions until ball 22 seats on the metering valve seat member 25 and blocks flow from the inlet port 19 to the outlet port 21. This is only a temporary phase, since the control plunger 18 will then move back towards the proportioning valve plunger under the difference between master cylinder pressure and brake pressure acting on a piston area equivalent to the cross-sectional area of bore portion 16, the only resistance being seal friction and the effort need to unseat the metering valve ball 22 against spring 24 and against the same pressure differential.

Unseating the metering ball 22 allows a quantity of fluid to pass ball 22 so that brake pressure rises momentarily, allowing the proportioning valve plunger 17 to move against the loading spring 26 and again allowing the metering valve ball 22 to seat. This opening and closing of the metering valve is the operative state and occurs repeatedly as master cylinder pressure continues to increase, the control plunger following the movement of the proportioning valve plunger as it compresses the loading spring 26 and brake pressure continuing to increase with only a small reduction on the master cylinder pressure.

Meanwhile, the brakes are working to decelerate the vehicle so that the deceleration valve ball 38 is tending to roll up the ramp of liner 39 and into contact with seat member 41. The end of the axial passage 34 is then blocked by ball 38, brake fluid being trapped in the control chamber 32 and acting as locking means to prevent further movement of plunger 18 in the stepped bore.

With increasing master cylinder pressure the metering valve ball 22 seats as the proportioning valve plunger moves further against the loading spring 26. However, a small further increase in master cylinder pressure then acts on plunger 17 against the brake pressure to move plunger 17 back towards the control plunger 18, unseating the metering valve ball 22 momentarily since pin 28 cannot move against the locked control plunger 18. This allows a small quantity of brake fluid to pass the metering valve ball 22 to increase the brake pressure at the outlet port 21 until the increased brake pressure forces the proportioning valve plunger 17 back against the biassing spring load. As master cylinder pressure continues to increase, plunger 17 shuttles to and fro, opening and closing the metering valve and allowing brake pressure to increase at a reduced rate compared with master cylinder pressure.

The restrictor 37A has the effect of limiting the rate at which pressure rises in chamber 35 when there is a rapid rise in master cylinder pressure. This compensates for the inertia of the ball 38. The size of the restrictor can be selected so that the ball 38 seats on the seat member 41 at the same magnitude of vehicle deceleration irrespective of the rate of rise in master cylinder pressure. The control spring 43 exerts on the control mass of ball 38 a load which varies according to the distance moved by the control plunger 18 before the control passage is closed by the ball 38 seating on seat member 41. The effect of the variation caused by spring 43 is that the deceleration valve ball 38 seats at a magnitude of vehicle deceleration which will vary according to the extent to which the vehicle is loaded. For example, in a heavily laden vehicle, plungers 17 and 18 will move further against the load of spring 26 before the ball 38 can touch the end of the control plunger 18. Hence the load of the biassing spring 43 will be less and a greater magnitude of deceleration is required before the ball 38 can seat.

Modifications to the valve shown in FIG. 1 are possible. For example, the control spring may act to urge the deceleration valve ball away from the control plunger. Also, to avoid or minimise the small difference between master cylinder pressure and brake pressure during movement of the proportioning valve plunger against the loading spring before the deceleration valve operates, a spring may be used to bias the control plunger towards the proportioning valve plunger.

The valve shown in FIG. 2 is a further modification to that shown in FIG. 1 so that where appropriate the same reference numerals will be used with the addition of 100. The principal differences are that the control plunger 118 has only one working diameter and that the deceleration valve ball 138 works in conjunction with a closure ball 151. The valve is also mounted differently as indicated in FIG. 2 by the horizontal axis and direction of travel $A_T$, the vertical axis $A_V$ and plunger axis $A_P$, so that during braking ball 138 tends to move away from the control plunger 118.

As shown in FIG. 2, the deceleration valve ball 138 is preventing ball 151 from seating by means of a pin 152 in passage 137 acting against the load of a seating spring 153.

During initial braking the proportioning valve plunger 117 moves against the loading spring 126 with the control plunger 118 following to maintain brake pressure at outlet port 121 only slightly below master cylinder pressure at the inlet port 119.

When a predetermined vehicle deceleration is attained, the deceleration valve ball 138 moves against a biassing spring 143 away from a control spring 143A allowing ball 151 to seat. This closes the passage 137 connecting the inlet port 119 and chamber 135 which acts as the control chamber, preventing any further variation in the volume of brake fluid in control chamber 135. The control plunger 118 is now locked against further movement during increasing master cylinder pressure so that the proportioning valve plunger 117 can shuttle to allow brake pressure to increase with increasing brake pressure but at a reduced rate, as described above for the valve shown in FIG. 1.

The biassing spring 143, although acting on the ball 128 to bias it in the direction of the control plunger 118, does not have the same function as the control spring 43 in FIG. 1. Instead, control spring 143A acts between the control plunger 118 and the ball 138 with a force which diminishes as the control plunger 118 follows the proportioning valve plunger as master cylinder pressure increases. Thus the control spring 143A exerts a load on the control mass of ball 138 which varies according to the distance moved by the control plunger 118 before the control passage 137 is closed by forward movement of the ball 138.

I claim:

1. A vehicle brake pressure proportioning valve comprising:
    a housing;
    a inlet port in the housing for connection to a driver-controlled source of fluid pressure;
    an outlet port in the housing for connection to rear brakes of the vehicle;
    a stepped bore in the housing;
    a stepped proportioning valve plunger slidable in the stepped bore and having one, relatively small, piston area subject to inlet pressure from the inlet port and another, relatively large, piston area subject to brake pressure at the outlet port;
    a loading spring which applies a biassing load to the proportioning valve plunger in a direction opposing movement of the plunger under the action of brake pressure at the inlet port;
    metering valve means associated with the proportioning valve plunger for controlling flow between the inlet port and the outlet port;
    a control plunger slidable in the stepped bore and co-operating with the metering valve means such that relative movement of the proportioning valve plunger away from the control valve plunger changes the metering valve means from an open state permitting flow between the inlet port and the outlet port and a closed state preventing flow from the inlet port to the outlet port, the control plunger being movable with the proportioning valve plunger during movement of the proportioning valve plunger against the biassing load when brake pressure is increasing;
    a liquid filled control chamber having a volume which varies with movement of the control plunger in the stepped bore;
    a control passage connecting the inlet port and the control chamber;
    a control mass movable in the housing under vehicle deceleration;
    inertia valve means including the control mass for closing the control passage;
    and control spring means for applying to the control mass a load which varies according to the distance moved by the control plunger before the control passage is closed.

2. The proportioning valve of claim 1 further comprising a restrictor in the control passage.

3. The proportioning valve of claim 2, wherein the restrictor is between the inlet port and the inertia valve means.

4. The proportioning valve of claim 1, wherein the control plunger is stepped, the control chamber being formed by an annular chamber defined by the control plunger and the stepped bore.

5. The proportioning valve of claim 4, wherein the control plunger has an axial passage communicating between the control chamber and the inertia valve means.

6. The proportioning valve of claim 5, wherein the control mass is movable under vehicle deceleration to block the end of the axial passage.

7. The proportioning valve of claim 4, wherein the control spring acts between the housing and the control means.

8. The proportioning valve of claim 6, wherein the control spring acts between the housing and the control mass and biasses the control mass towards the control plunger.

9. The proportioning valve of claim 1 further comprising an inertia valve member in the control passage, a valve seat in the control passage and a seating spring urging the inertia valve member towards the valve seat, the control mass normally acting to unseat the inertia valve member but being movable under vehicle deceleration to allow the inertia valve member to seat under the action of the seating spring.

10. The proportioning valve of claim 9, wherein the control spring acts between the control mass and the control plunger, the control mass being movable away from the control plunger under vehicle deceleration.

11. The proportioning valve of claim 10 further comprising a biassing spring which acts between the control mass and the housing.

12. The proportioning valve of claim 11, wherein the biassing spring biasses the control mass towards the control plunger.

* * * * *